(12) United States Patent
Sekiya et al.

(10) Patent No.: US 7,039,325 B2
(45) Date of Patent: May 2, 2006

(54) COMMUNICATION SYSTEM

(75) Inventors: Motoyoshi Sekiya, Kawasaki (JP);
Takashi Toyomaki, Hokkaido (JP)

(73) Assignee: Fujitsu Limited, Kawasaki (JP)

( * ) Notice: Subject to any disclaimer, the term of this patent is extended or adjusted under 35 U.S.C. 154(b) by 574 days.

(21) Appl. No.: 09/924,781

(22) Filed: Aug. 9, 2001

(65) Prior Publication Data

US 2002/0126336 A1    Sep. 12, 2002

(30) Foreign Application Priority Data

Mar. 6, 2001    (JP) .............................. 2001-061348

(51) Int. Cl.
*H04B 10/00* (2006.01)

(52) U.S. Cl. ...................... 398/181; 398/177

(58) Field of Classification Search ................ 398/177, 398/181
See application file for complete search history.

(56) References Cited

U.S. PATENT DOCUMENTS

| | | | |
|---|---|---|---|
| 4,401,364 A | 8/1983 | Mochizuki | 350/96.16 |
| 4,616,898 A | 10/1986 | Hicks, Jr. | 350/96.15 |
| 4,805,977 A | 2/1989 | Tamura et al. | 350/96.16 |
| 5,883,735 A * | 3/1999 | Sugiyama et al. | 359/341.42 |
| 6,647,211 B1 * | 11/2003 | Terahara et al. | 398/106 |

FOREIGN PATENT DOCUMENTS

JP    1018666 A1    7/2000

OTHER PUBLICATIONS

Kokusaitsuushin no kenkyu No. 134, Oct. 1987, pp. 383-390, "Direct Optical Amplification by Fibre Raman Amplifier", Oct. 1987.
Electronics Letters, Sep. 3$^{rd}$ 1998, vol. 34, No. 18, pp. 1745-1747, Sep. 3, 1988.
OSA Tops vol. 30, "Optical Amplifiers and Their Applications", pp. 101-105.

* cited by examiner

*Primary Examiner*—Agustin Bello
(74) *Attorney, Agent, or Firm*—Staas & Halsey LLP

(57) ABSTRACT

A communication system that improves operation and maintenance and controls communication efficiently. A supervisory signal sending control section controls the sending of a supervisory signal for having supervisory control of optical communication and a drive supervisory signal for controlling the driving of an optical fiber amplifier for performing optical amplification by using a non-linear optical phenomenon in an optical fiber. A sending stop section receives a stop signal and stops the sending of the drive supervisory signal. A drive control section receives the drive supervisory signal and controls the driving of the optical fiber amplifier. A stop signal sending section sends the stop signal to a sending unit after the optical fiber amplifier being driven.

8 Claims, 9 Drawing Sheets

COMMUNICATION SYSTEM

BACKGROUND OF THE INVENTION (1) Field of the Invention

This invention relates to a communication system and, more particularly, to a communication system for controlling optical communication.

(2) Description of the Related Art

Optical communication network technologies are nuclei for building a data communication network infrastructure. It is hoped that more advanced services will be provided in a wider area. Such technologies therefore are being developed at a rapid pace toward an information-oriented society.

In recent years the wavelength division multiplex (WDM) technique is widely used in optical communication. WDM is a system in which light with different wavelengths is multiplexed and in which a plurality of signals are transmitted simultaneously through one optical fiber.

In a WDM system, not only a main signal but also an optical supervisory signal at a frequency between about 1 and 150 MHz called an optical supervisory channel (OSC) is used. This OSC signal and a main signal are wavelength-multiplexed and transmitted. This OSC signal will be used to control setting and state supervision for lines, linear repeaters, and the like.

For example, this OSC signal not only controls setting and state supervision for an optical amplifier in a repeater but also detects a failure on a transmission line. In a WDM system, therefore, usually only a main signal is amplified by an optical amplifier (erbium-doped optical fiber amplifier (EDFA)) and is transmitted. An OSC signal transmitted does not pass through an optical amplifier.

An OSC signal is used as a control signal, so its sending level is relatively low to prevent it from interfering with a main signal. Furthermore, the transmission rate of an OSC signal is relatively low, so it does not produce much noise. This enables to set its receiving level to a small value near the noise limit of a receiver. In practice it is necessary to use a photocoupler to multiplex an OSC signal and a main signal or to separate them. The insertion loss of this photocoupler therefore must be taken into consideration. As a result, the transmission distance will be about 120 km.

Meanwhile, with recent optical communication systems, attention has been focused on an optical fiber amplifier (Raman amplifier) which uses a non-linear optical phenomenon in an optical fiber called Raman amplification. This amplifier uses the physical phenomenon of light with a wavelength different from that of incident light being scattered by vibration in a substance. With an optical fiber amplifier, optical amplification can be performed by sending strong pumping light into an entire transmission line (for example, in order to amplify an optical signal with a wavelength of 1.55 μm, pumping light with a wavelength of 1.45 μm should be sent).

By using such a Raman amplifier in a WDM system and performing optical amplification on both of main and OSC signals, an optical fiber with a length longer than before can be laid. This will enable to widen repeater spacing (the conventional transmission distance of about 120 km can be increased to 200 km or more).

Repeater spacing is wider than before. Therefore, when such a Raman amplifier in a WDM system is not operating, an OSC signal will attenuate in a transmission line and fall below the minimum receiving level.

An OSC signal is a control signal for setting etc. Therefore, only an OSC signal must first be sent to each node at the time of starting a system. However, a Raman amplifier is not operating at the time of starting a system, so an OSC signal cannot be transmitted.

Conventionally, the driving of Raman amplifiers at nodes is controlled individually, and the starting of the entire system is controlled after all the Raman amplifiers are driven. This will cause inefficiency in operation and maintenance.

SUMMARY OF THE INVENTION

An object of the present invention is to provide a communication system that improves operation and maintenance and controls communication efficiently.

In order to achieve the above object, a communication system for controlling optical communication is provided. This communication system comprises a sending unit including supervisory signal sending control means for controlling the sending of a supervisory signal for having supervisory control of optical communication and a drive supervisory signal for controlling the driving of an optical fiber amplifier for performing optical amplification by using a non-linear optical phenomenon in an optical fiber and sending stop means for receiving a stop signal and for stopping the sending of the drive supervisory signal and a receiving unit including the optical fiber amplifier, drive control means for receiving the drive supervisory signal and for controlling the driving of the optical fiber amplifier, and stop signal sending means for sending the stop signal to the sending unit after the optical fiber amplifier being driven.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
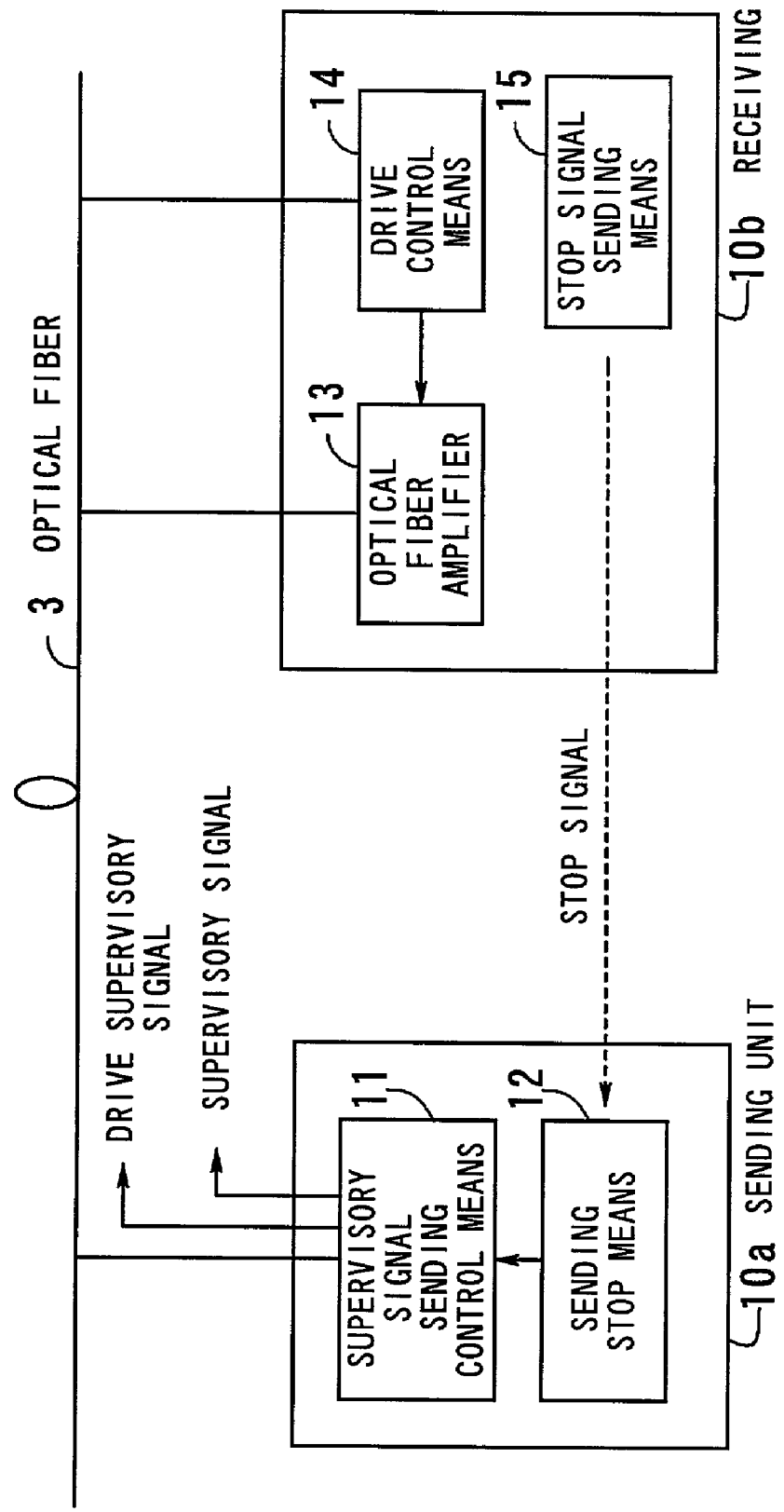
FIG. 1 is a view for describing the principles underlying a communication system according to the present invention.

Embodiments of the present invention will now be described with reference to the drawings. FIG. 1 is a view for describing the principles underlying a communication system according to the present invention. A communication system 1 comprises a sending unit 10a and a receiving unit 10b which are connected by an optical fiber 3 and controls optical communication performed by the WDM technique.

In fact the functions of the sending unit 10a and the receiving unit 10b according to the present invention will be included in one unit.

In the sending unit 10a, supervisory signal sending control means 11 controls the sending of a supervisory signal and drive supervisory signal. A supervisory signal corresponds to an OSC signal for having supervisory control of optical communication. A drive supervisory signal is a new supervisory signal used in the present invention. This signal will be used at the time of starting a transmission system (that is to say, this signal will be used to drive an optical fiber amplifier 13). Sending stop means 12 receives a stop signal sent from the receiving unit 10b and stops the sending of a drive supervisory signal.

In the receiving unit 10b, the optical fiber amplifier 13 is a Raman amplifier for performing Raman amplification over the whole length of the optical fiber 3. Drive control means 14 receives a drive supervisory signal sent from the sending unit 10a and controls the driving of the optical fiber amplifier 13. Stop signal sending means 15 sends a stop signal to the sending unit 10a after the optical fiber amplifier 13 is driven.

Figure 2:
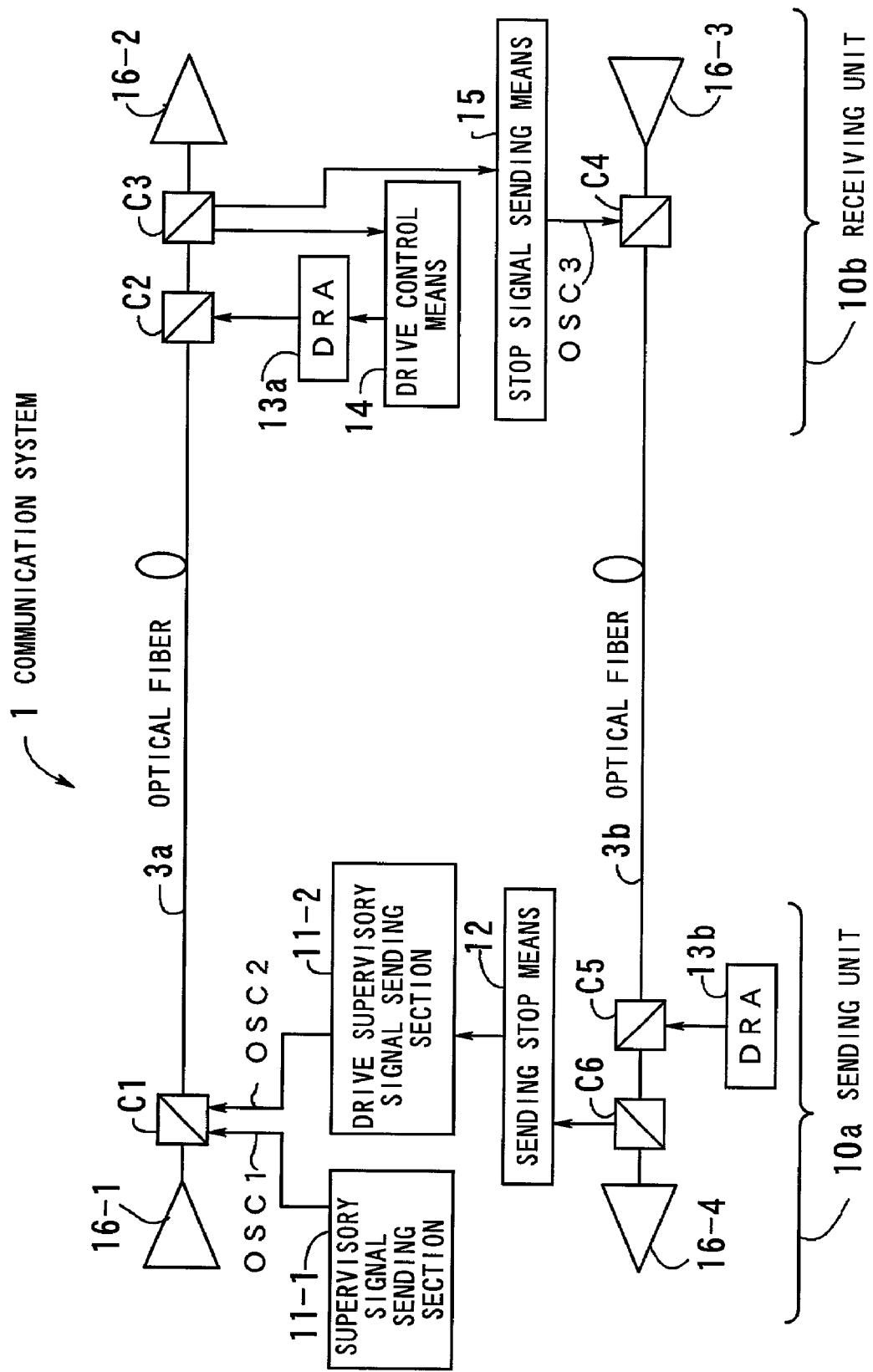
FIG. 2 is a view showing the configuration of the communication system.

Now, the configuration and operation of the communication system 1 (a first embodiment of the present invention) will be described. FIG. 2 is a view showing the configuration of the communication system 1. Hereinafter, a Raman amplifier, being an optical fiber amplifier, is referred to as a distributed Raman amplifier (DRA).

The sending unit 10a and the receiving unit 10b are connected by optical fibers 3a and 3b. An erbium-doped optical fiber amplifier (EDFA) 16-1, optical couplers C1 through C3, and an EDFA 16-2 are connected to the optical fiber 3a. An EDFA 16-3, optical couplers C4 through C6, and an EDFA 16-4 are connected to the optical fiber 3b. The supervisory signal sending control means 11 comprises a supervisory signal sending section 11-1 and a drive supervisory signal sending section 11-2.

At the time of starting the system, the supervisory signal sending section 11-1 outputs an ordinary OSC supervisory signal (OSC1) and the drive supervisory signal sending section 11-2 outputs a drive supervisory signal (OSC2). The bit rate of the OSC2 is set to a small value so that even when a DRA 13a is not operating, its level will not fall below the minimum receiving level on the receiving side (for drive control means 14). The optical coupler C1 multiplexes the OSC1 and OSC2 and transmits them onto the optical fiber 3a.

In this case, the DRA 13a is not operating, so the OSC1 cannot reach the receiving unit 10b due to attenuation on a transmission line. On the other hand, the OSC2 is received by the drive control means 14 via the optical couplers C2 and C3.

The drive control means 14 drives the DRA 13a when it receives the OSC2. When the DRA 13a is driven, the OSC1 can be received by the receiving unit 10b and is received by the stop signal sending means 15 via the optical couplers C2 and C3.

When the stop signal sending means 15 receives the OSC1, it outputs a stop signal (OSC3) to the sending unit 10a in order to stop the sending of the OSC2. The bit rate of the OSC3 is set to a small value so that even when a DRA 13b is not operating, its level will not fall below the minimum receiving level on the receiving side (for sending stop means 12). The OSC3 is transmitted onto the optical fiber 3b via the optical coupler C4.

The OSC3 is received by the sending stop means 12 via the optical couplers C5 and C6. When the sending stop means 12 receives the OSC3, it has the drive supervisory signal sending section 11-2 stop the outputting of the OSC2. The same control will be performed to drive the DRA 13b.

Now, a method for setting the bit rate of an OSC2 will be described. In general there is a proportional relationship between a minimum receiving level and a bit rate. The bit rate of an OSC2 according to the present invention must be lowered so that it will be received even in a state in which a DRA produces no gain.

It is assumed that the bit rates of an OSC1 and OSC2 are $B_{OSC1}$ (=1.5 Mb/s) and $B_{OSC2}$ respectively and that the gain of a DRA for an OSC1 is $G_{DRA@OSC1}$. Then their relationship will be given by the following expression:

[Expression 1]

$$B_{OSC1}/B_{OSC2} = 10^{\wedge}(G_{DRA@OSC1}/10) \qquad (1)$$

where $10^{\wedge}A = 10^A$. Bit rate $B_{OSC2}$ is calculated from expression 1 and an OSC2 (or OSC3) will be transmitted at this rate.

Figure 3:
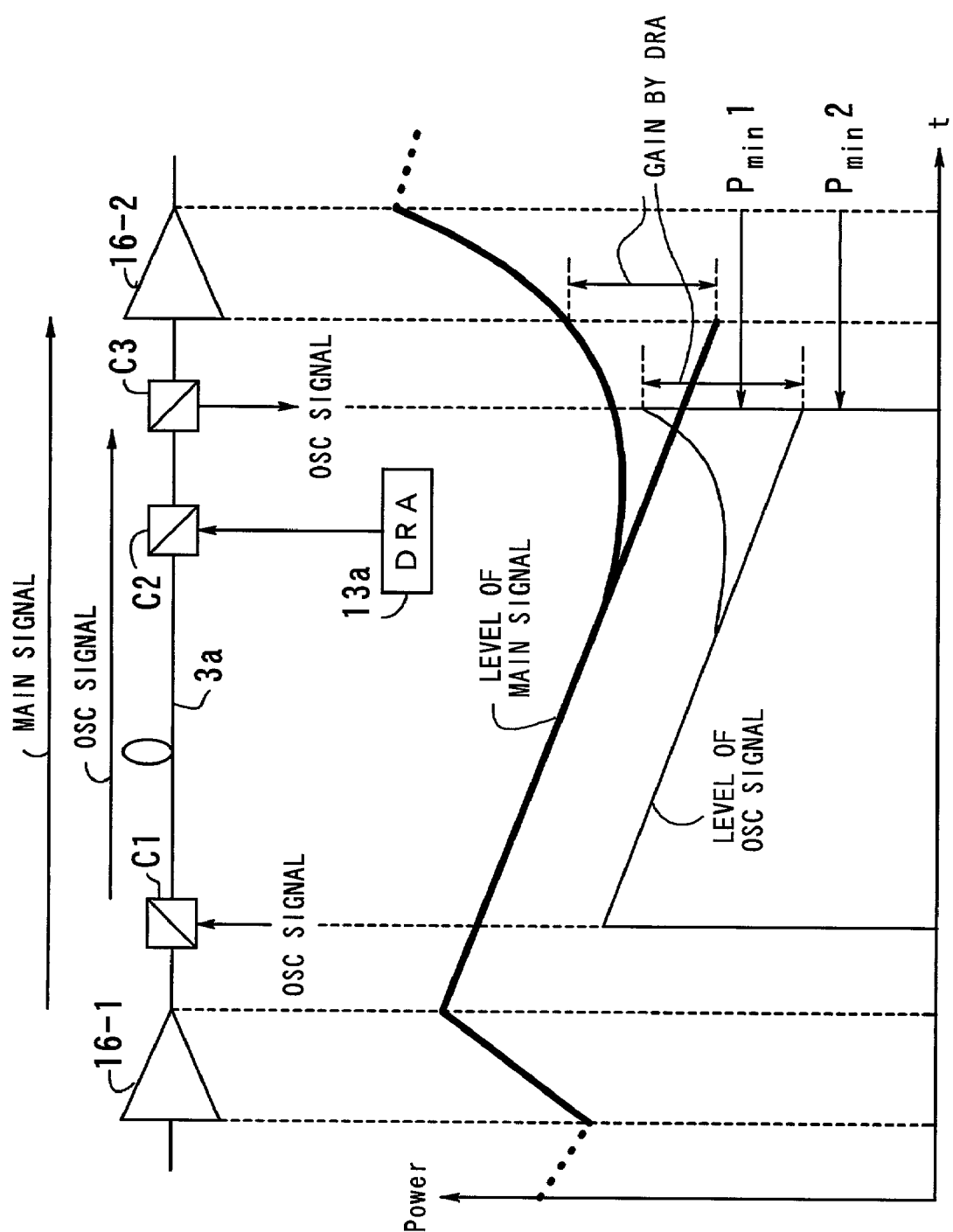
FIG. 3 is a view showing a level diagram.

The contents of the present invention will now be described with a level diagram of transmitted signals. FIG. 3 is a view showing a level diagram. The vertical axis indicates the intensity of light and the horizontal axis indicates time. A change in the level of a main signal is indicated by a thick solid line and a change in the level of an OSC1 is indicated by a thin solid line.

When the DRA 13a is operating, a main signal is amplified by the EDFA 16-1 and then transmitted via the optical fiber 3a. In this case, the main signal will attenuate with time, but it will be amplified again by the DRA 13a and EDFA 16-2. An OSC1 is transmitted via the optical fiber 3a without being amplified by the EDFA 16-1. The OSC1 will attenuate with time, but it will be amplified again by the DRA 13a.

It is assumed that the minimum receiving level of the OSC1 is Pmin1. At the time of starting the system when the DRA 13a is not operating, the OSC1 will attenuate and fall below minimum receiving level Pmin1. As a result, normal receiving is impossible.

Accordingly, in the present invention, when the DRA 13a is not operating, it is driven at the time of starting the system by using an OSC2 transmitted at a bit rate which enables normal receiving on the receiving side. The minimum receiving level of an OSC2 is Pmin2 shown in FIG. 3.

Modifications of the first embodiment will now be described. In the above first embodiment, the supervisory signal sending control means 11 includes a source of an OSC1 (the supervisory signal sending section 11-1) and a source of an OSC2 (the drive supervisory signal sending section 11-2), which are separate from each other, and sends an OSC1 and OSC2, which are transmitted at different rates, at the same time. In a first modification, switching will be performed between OSC1 sending and OSC2 sending. Hereinafter descriptions of stop control with an OSC3 will be omitted.

Figure 4:
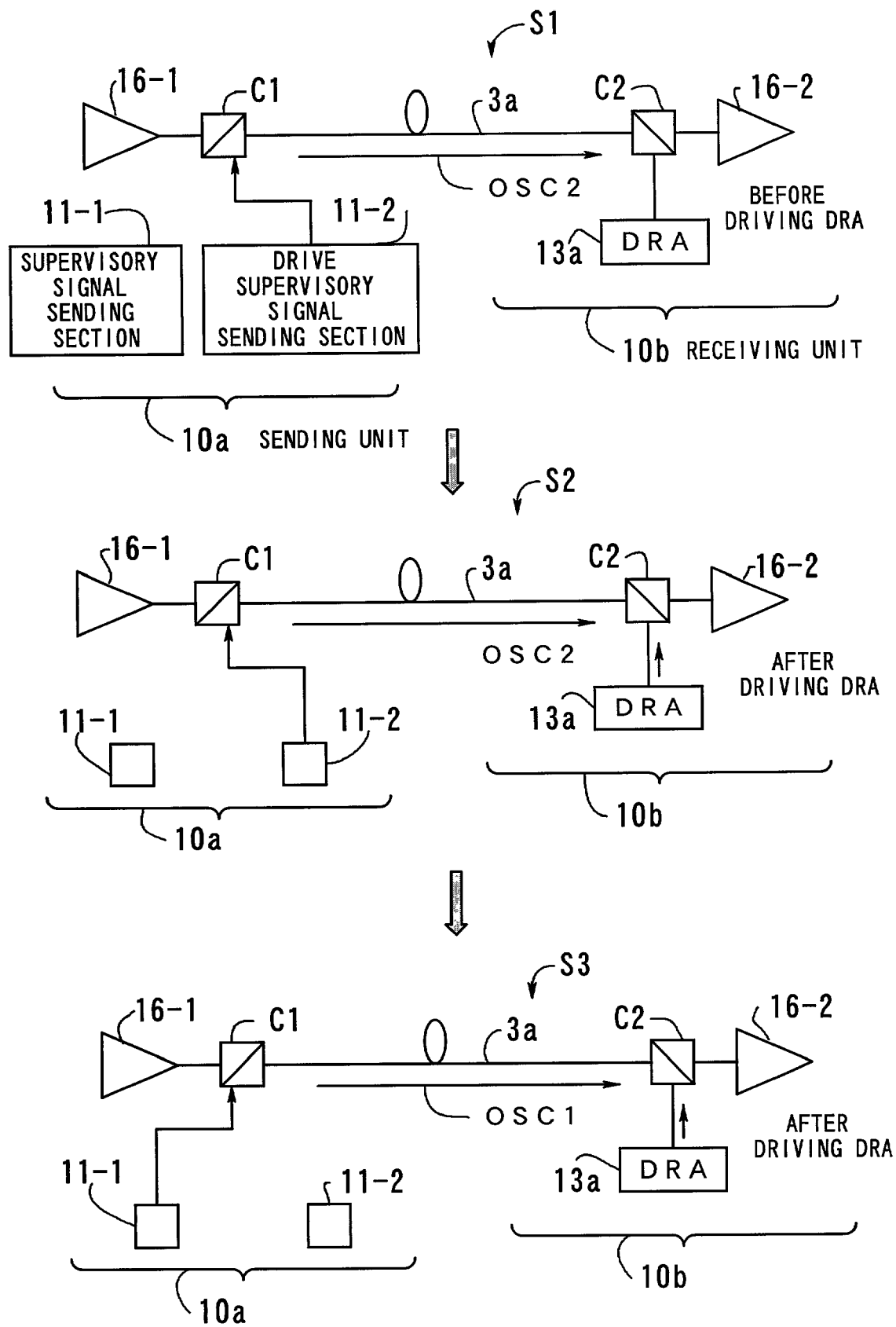
FIG. 4 is a view showing an overview of a first modification.

FIG. 4 is a view showing an overview of the first modification. An EDFA 16-1, optical couplers C1 and C2, and an EDFA 16-2 are connected to an optical fiber 3a. A DRA 13a is connected to the optical coupler C2 in a receiving unit lob. A sending unit 10a includes a supervisory signal sending section 11-1 for sending an OSC1 and a drive supervisory signal sending section 11-2 for sending an OSC2. The other components shown in FIG. 2 are omitted.

[S1] At the time of starting the system, the sending unit 10a sends only an OSC2 with the drive supervisory signal sending section 11-2.

[S2] When the OSC2 reaches, the DRA 13*a* begins to operate.

[S3] After the DRA 13*a* operates, the sending unit 10*a* switches over from OSC2 sending to OSC1 sending and sends an OSC1 with the supervisory signal sending section 11-1.

Figure 5:
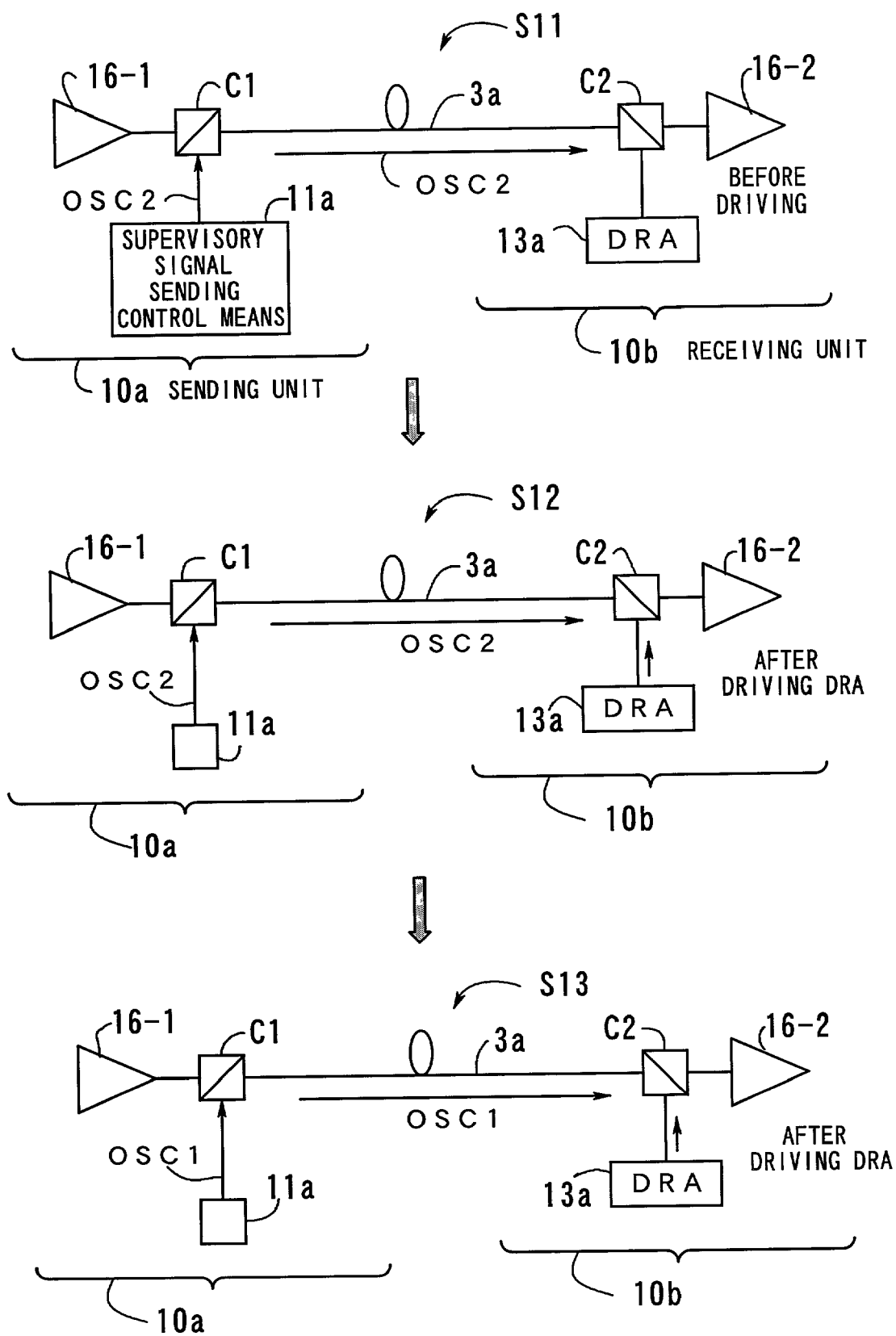
FIG. 5 is a view showing an overview of a second modification.

FIG. 5 is a view showing an overview of a second modification. In the second modification, one signal source which can control a transmission rate variably is used to perform switching between OSC1 sending and OSC2 sending. An OSC1 and OSC2 are transmitted at different rates. A sending unit 10*a* includes supervisory signal sending control means 11*a* as the above signal source.

[S11] At the time of starting the system, the sending unit 10*a* sends only an OSC2 with the supervisory signal sending control means 11*a*.

[S12] When the OSC2 reaches, a DRA 13*a* begins to operate.

[S13] After the DRA 13*a* operates, the sending unit 10*a* switches over from OSC2 sending to OSC1 sending and sends an OSC1 with the supervisory signal sending control means 11*a*.

As described above, in the first embodiment, an OSC2 the bit rate of which is set to a small value to prevent its level from falling below the minimum receiving level on the receiving side is sent at the time of starting a system. After a DRA 13*a* operates, only an OSC1 is sent. This enables to start a transmission system efficiently, resulting in the improvement of the operation and maintenance of the system.

A second embodiment of the present invention will now be described. In the second embodiment, an OSC2 is sent with its wavelength set to a value being within the range of an empty band in a transmission band for a main optical signal.

Figure 6:
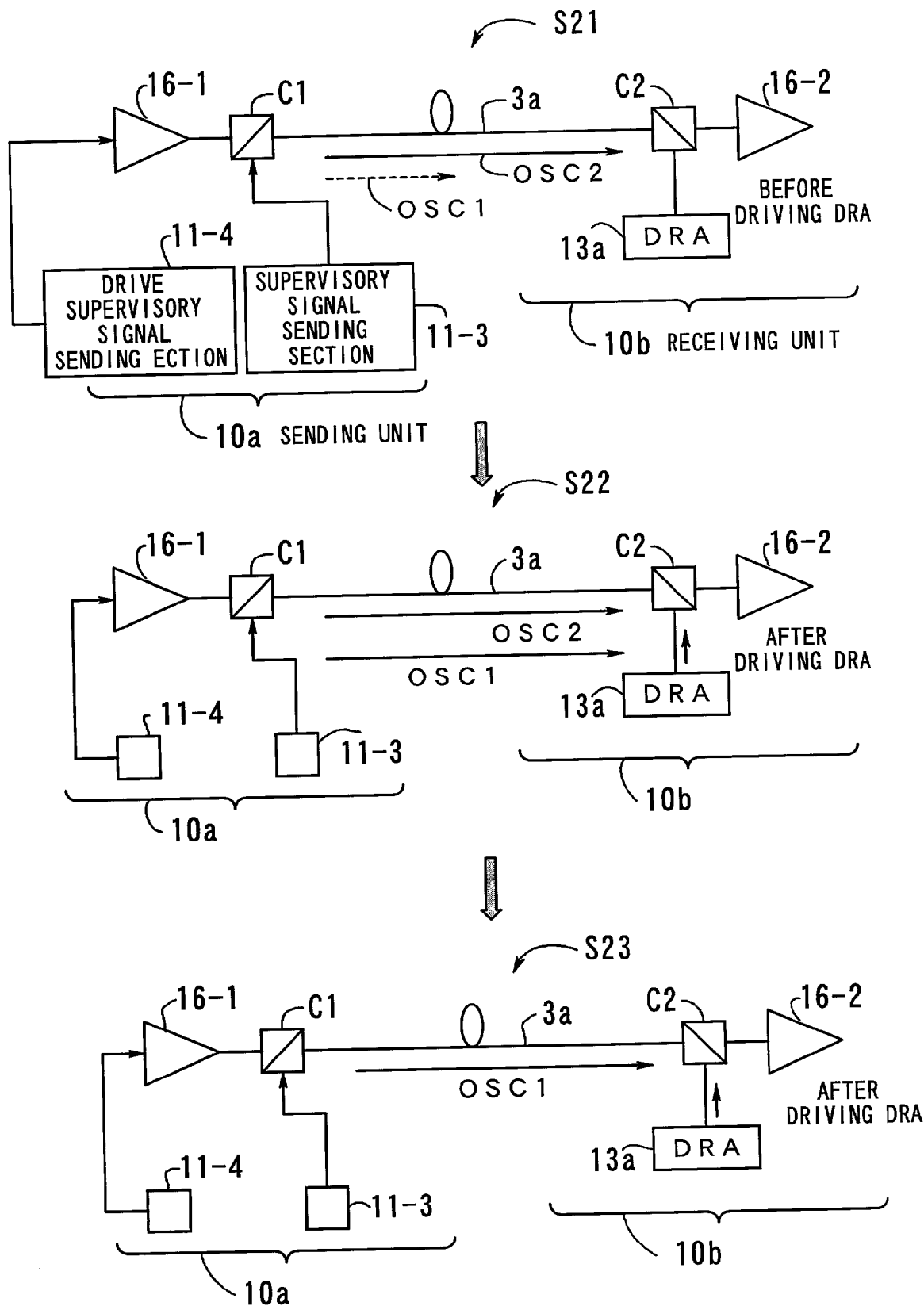
FIG. 6 is a view showing an overview of a second embodiment of the present invention.

FIG. 6 is a view showing an overview of the second embodiment of the present invention. A supervisory signal sending section 11-3 outputs an OSC1 to an optical coupler C1. A drive supervisory signal sending section 11-4 outputs an OSC2 the wavelength of which is set to a value being within the range of an empty band in a transmission band for a main optical signal to an input section of an EDFA 16-1. As for the rest, it is the same with FIG. 4.

[S21] At the time of starting the system, a sending unit 10*a* sends an OSC1 and OSC2 with the supervisory signal sending section 11-3 and drive supervisory signal sending section 11-4.

[S22] When the OSC2 amplified by the EDFA 16-1 reaches, a DRA 13*a* begins to operate.

[S23] After the DRA 13*a* operates, the sending unit 10*a* stops the sending of an OSC2 and sends only an OSC1 with the supervisory signal sending section 11-3.

Now, modifications of the second embodiment will be described. In a first modification, switching between OSC1 sending and OSC2 sending is performed. Its configuration is the same as that shown in FIG. 6.

Figure 7:
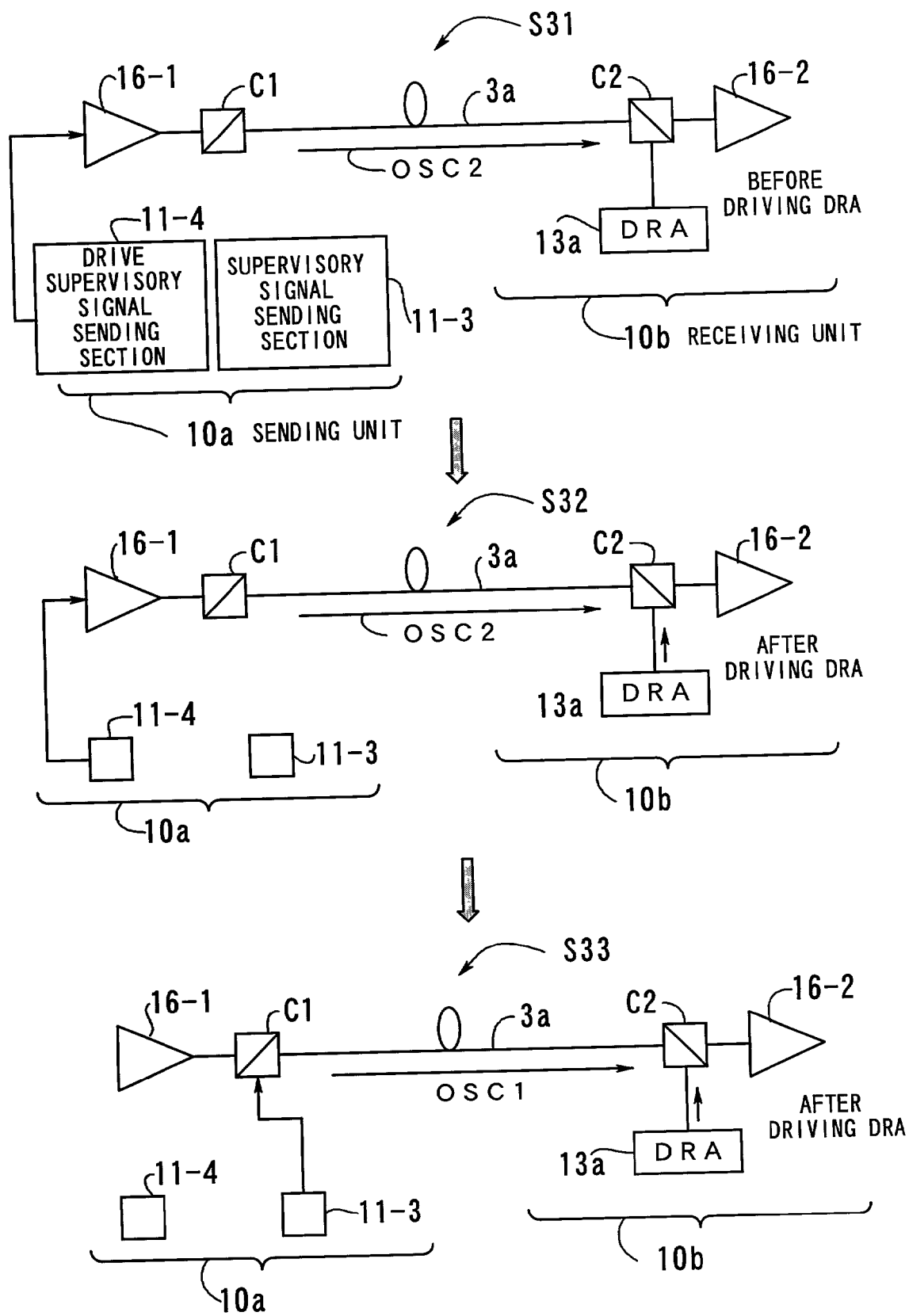
FIG. 7 is a view showing an overview of a first modification.

FIG. 7 is a view showing an overview of the first modification.

[S31] At the time of starting the system, a sending unit 10*a* sends only an OSC2 with a drive supervisory signal sending section 11-4.

[S32] When the OSC2 reaches, a DRA 13*a* begins to operate.

[S33] After the DRA 13*a* operates, the sending unit 10*a* switches over from OSC2 sending to OSC1 sending and sends only an OSC1 with a supervisory signal sending section 11-3.

Figure 8:
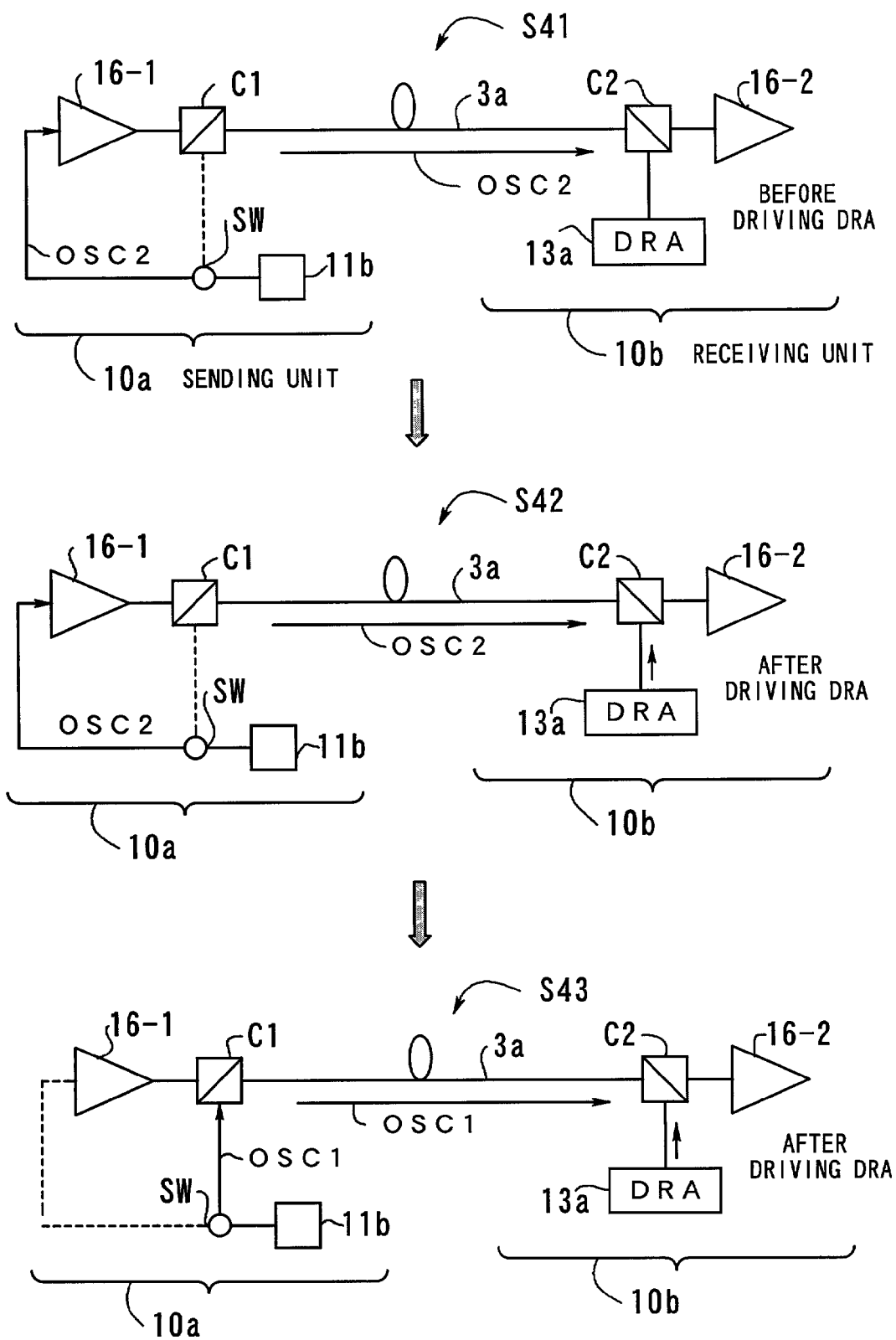
FIG. 8 is a view showing an overview of a second modification.

FIG. 8 is a view showing an overview of a second modification. In the second modification, one signal source which can control wavelengths variably is used to perform switching between OSC1 sending and OSC2 sending. The wavelengths of an OSC1 and OSC2 are different from each other. A sending unit 10*a* includes supervisory signal sending control means 11*b* as the above signal source and an optical switch SW. As for the rest, it is the same with FIG. 4.

[S41] At the time of starting the system, the supervisory signal sending control means 11*b* in the sending unit 10*a* outputs an OSC2. The optical switch SW outputs the OSC2 to an input section of an EDFA 16-1. The OSC2 amplified by the EDFA 16-1 is transmitted onto an optical fiber 3*a*.

[S42] When the OSC2 reaches, a DRA 13*a* begins to operate.

[S43] After the DRA 13*a* operates, the supervisory signal sending control means 11*b* outputs an OSC1. The optical switch SW outputs the OSC1 to an optical coupler C1. The OSC1 is transmitted onto the optical fiber 3*a* via the optical coupler C1.

As described above, in the second embodiment, an OSC2 the wavelength of which is set to a value being within the range of an empty band in a transmission band for a main optical signal is sent at the time of starting a system via an optical amplifier for amplifying a main optical signal. After a DRA 13*a* operates, only an OSC1 is sent. This enables to start a transmission system efficiently, resulting in the improvement of the operation and maintenance of the system.

Figure 9:
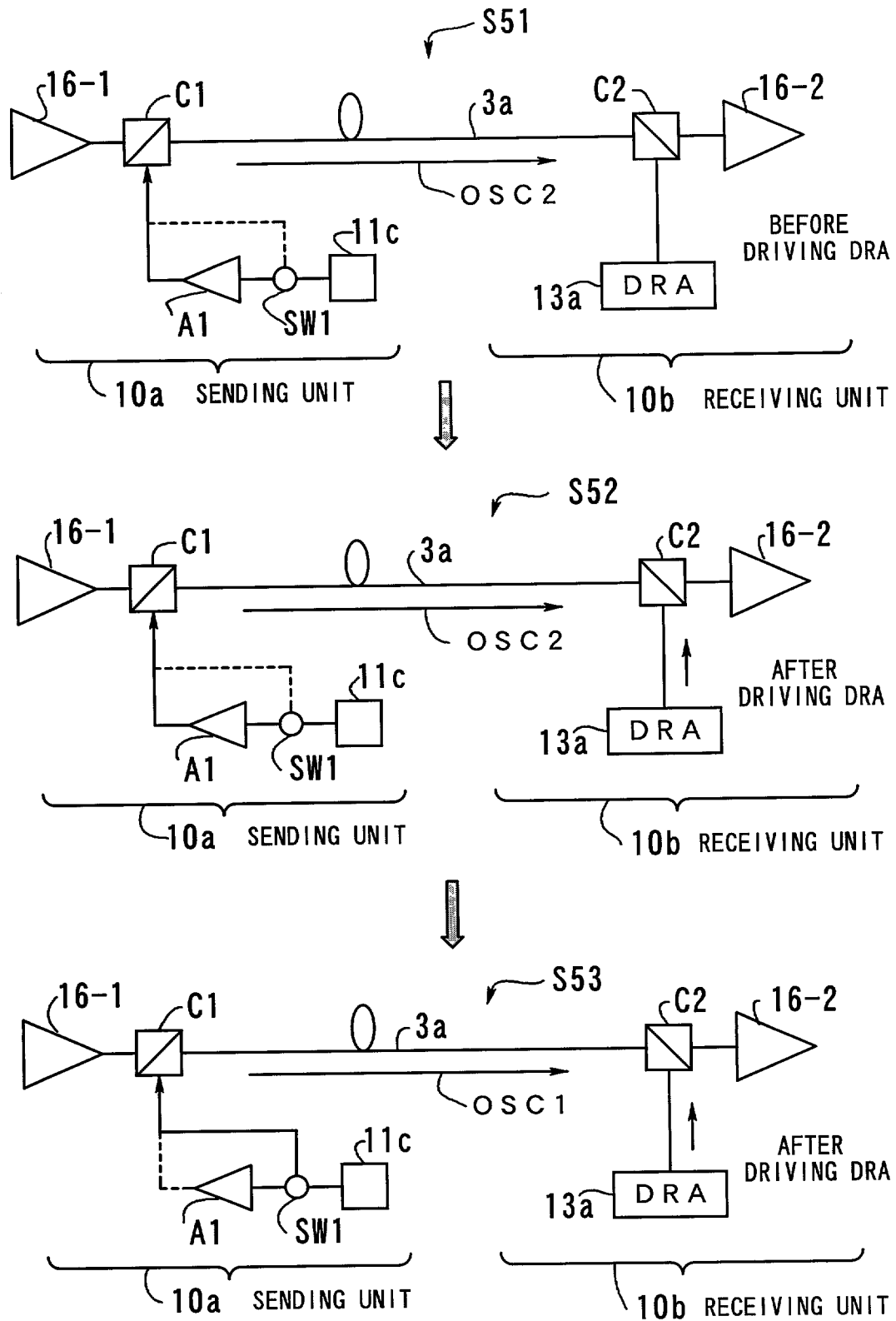
FIG. 9 is a view showing an overview of a third embodiment of the present invention.

A third embodiment of the present invention will now be described. In the third embodiment, an OSC2 is amplified and sent. FIG. 9 is a view showing an overview of the third embodiment of the present invention.

A sending unit 10*a* includes supervisory signal sending control means 11*c* for sending an OSC1 and OSC2, the wavelengths of which are different from each other, by switching, an optical switch SW1, and optical amplifier A1. As for the rest, it is the same with FIG. 4.

[S51] At the time of starting the system, the supervisory signal sending control means 11*c* outputs an OSC2. The optical switch SW1 outputs the OSC2 to the optical amplifier A1. The optical amplifier A1 amplifies the OSC2. The amplified OSC2 is transmitted onto an optical fiber 3*a* via an optical coupler C1.

[S52] When the OSC2 reaches, a DRA 13*a* begins to operate.

[S53] After the DRA 13*a* operates, the supervisory signal sending control means 11*c* outputs an OSC1. The optical switch SW1 outputs the OSC1 to the optical coupler C1. The OSC1 is transmitted onto the optical fiber 3*a* via the optical coupler C1.

As described above, in the third embodiment, an amplified OSC2 is sent at the time of starting a system. After a DRA 13*a* operates, an ordinary OSC1 is sent. This enables to start a transmission system efficiently, resulting in the improvement of the operation and maintenance of the system.

The three processes of lowering a bit rate, setting a wavelength to a value being within the range of an empty band in a transmission band for a main optical signal, and amplifying have been performed on an OSC2 sent at the time of starting a system. In addition to these processes, however, an error-correcting code for forward error correction (FEC) may be added to an OSC2 sent. This will enable to improve S/N and therefore to start a transmission system more efficiently.

As has been described in the foregoing, a communication system according to the present invention controls the sending of a supervisory signal for having supervisory control of optical communication and a drive supervisory signal for controlling the driving of an optical fiber amplifier and stops the sending of the drive supervisory signal after driving the optical fiber amplifier. This enables to start a transmission system efficiently, resulting in the improvement of the operation and maintenance of the system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system for controlling optical communication, the system comprising:
    a sending unit including: supervisory signal sending control means for controlling the sending of a supervisory signal for having supervisory control of optical communication and a drive supervisory signal for controlling the driving of a Raman optical fiber amplifier for performing Raman optical amplification by using a non-linear optical phenomenon in an optical fiber, and sending stop means for receiving a stop signal and for stopping the sending of the drive supervisory signal; and
    a receiving unit including: the Raman optical fiber amplifier, drive control means for receiving the drive supervisory signal and for controlling the driving of the Raman optical fiber amplifier, and stop signal sending means for sending the stop signal to the sending unit after the Raman optical fiber amplifier being driven;
    wherein the supervisory signal sending control means sets a transmission rate of the drive supervisory signal to a minimized value and sends the drive supervisory signal so that the drive supervisory signal can be received in a state in which the Raman optical fiber amplifier is not operating; and
    a bit rate $B_{OSC2}$ of the drive supervisory signal is given by $$B_{OSC2} = B_{OSC1}/10^{\wedge}(G_{DRA@OSC1}/10)$$

where $10^{\wedge}A = 10^A$,
    wherein $B_{OSC1}$ is a bit rate of the supervisory signal and $G_{DRA@OSC1}$ is a gain of the Raman amplifier for the supervisory signal.

2. The communication system according to claim 1, wherein the supervisory signal sending control means includes a source of the supervisory signal and a source of the drive supervisory signal which are separate from each other and performs the simultaneous or switching sending of the supervisory signal and the drive supervisory signal the transmission rates of which are different from each other.

3. The communication system according to claim 1, wherein the supervisory signal sending control means uses one signal source which can control a transmission rate variably to perform the switching sending of the supervisory signal and the drive supervisory signal the transmission rates of which are different from each other.

4. The communication system according to claim 1, wherein the supervisory signal sending control means sets the wavelength of the drive supervisory signal to a value being within the range of an empty band in a transmission band for a main optical signal and sends the drive supervisory signal.

5. The communication system according to claim 4, wherein the supervisory signal sending control means includes a source of the supervisory signal and a source of the drive supervisory signal which are separate from each other and performs the simultaneous or switching sending of the supervisory signal and the drive supervisory signal the wavelengths of which are different from each other.

6. The communication system according to claim 4, wherein the supervisory signal sending control means uses one signal source which can control a wavelength variably to perform the switching sending of the supervisory signal and the drive supervisory signal the wavelengths of which are different from each other.

7. The communication system according to claim 1, wherein the supervisory signal sending control means amplifies only the drive supervisory signal and sends the drive supervisory signal so that the drive supervisory signal can be received in a state in which the optical fiber amplifier is not operating.

8. A sending apparatus for controlling sending in optical communication, the apparatus comprising:
    supervisory signal sending control means for controlling the sending of a supervisory signal for having supervisory control of optical communication and a drive supervisory signal for controlling the driving of a Raman optical fiber amplifier for performing Raman optical amplification by using a non-linear optical phenomenon in an optical fiber; and
    sending stop means for receiving a stop signal and for stopping the sending of the drive supervisory signal;
    wherein the supervisory signal sending control means sets a transmission rate of the drive supervisory signal to a minimized value and sends the drive supervisory signal so that the drive supervisory signal can be received in a state in which the Raman optical fiber amplifier is not operating; and
    a bit rate $B_{OSC2}$ of the drive supervisory signal is given by $$B_{OSC2} = B_{OSC1}/10^{\wedge}(G_{DRA@OSC1}/10)$$

where $10^{\wedge}A = 10^A$,
    wherein $B_{OSC1}$ is a bit rate of the supervisory signal and $G_{DRA@OSC1}$ is a gain of the Raman amplifier for the supervisory signal.

* * * * *